US012661971B2

(12) United States Patent     (10) Patent No.:   US 12,661,971 B2

Kunifuda et al.     (45) Date of Patent:   Jun. 23, 2026

(54) ELECTRIC VEHICLE

(71) Applicant: TOYOTA JIDOSHA KABUSHIKI KAISHA, Toyota (JP)

(72) Inventors: Hiroki Kunifuda, Chiryu (JP); Yoji Kiyokawa, Okazaki (JP); Noriyuki Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 18/530,376

(22) Filed: Dec. 6, 2023

(65) Prior Publication Data

US 2024/0262179 A1    Aug. 8, 2024

(30) Foreign Application Priority Data

Feb. 8, 2023   (JP) ................................. 2023-017967

(51) Int. Cl.
| | |
|---|---|
| *B60K 6/405* | (2007.10) |
| *B60K 6/04* | (2006.01) |
| *B60K 6/24* | (2007.10) |
| *B60K 13/02* | (2006.01) |
| *B60L 53/00* | (2019.01) |

(52) U.S. Cl.
CPC ................ *B60K 6/405* (2013.01); *B60K 6/24* (2013.01); *B60K 13/02* (2013.01); *B60L 53/00* (2019.02); *B60Y 2200/92* (2013.01); *B60Y 2400/435* (2013.01)

(58) Field of Classification Search
CPC . B60K 6/405; B60K 6/24; B60K 6/22; B60K 13/02; B60K 13/00; B60L 53/00; B60Y 2200/92; B60Y 2400/435
See application file for complete search history.

(56) References Cited

U.S. PATENT DOCUMENTS

| | | | | |
|---|---|---|---|---|
| 8,478,466 | B2 * | 7/2013 | Luo ........................ | B60W 20/40 |
| | | | | 701/99 |
| 9,079,504 | B2 * | 7/2015 | Amano ................... | B60L 53/16 |
| 11,195,649 | B2 * | 12/2021 | Vafakhah ............... | B60K 6/365 |

(Continued)

FOREIGN PATENT DOCUMENTS

| | | |
|---|---|---|
| CN | 101445042 B | 3/2012 |
| EP | 2 781 394 A1 | 9/2014 |

(Continued)

*Primary Examiner* — John D Walters

(74) *Attorney, Agent, or Firm* — Oliff PLC

(57) ABSTRACT

An electric vehicle includes: an intake device provided upstream of an intake pipe of an engine; a power transmission device configured to transmit a power of an electric motor to drive wheel; an electric-power control device configured to control an electric power transferred between a driving battery and the electric motor; and a charger configured to charge the driving battery with the electric power supplied from an external power supply. The electric motor and the power transmission device constitute at least a part of a driving apparatus. The driving apparatus and the electric-power control device constitute a mechanical-electrical integrated unit which is housed in a single casing and which is located in a position adjacent to the engine. The charger and the intake device are located on an upper side of the mechanical-electrical integrated unit in a vertical direction of the electric vehicle.

7 Claims, 11 Drawing Sheets

(56)          References Cited

U.S. PATENT DOCUMENTS

| | | | |
|---|---|---|---|
| 2009/0166113 | A1 | 7/2009 | Luo et al. |
| 2009/0166122 | A1 | 7/2009 | Luo et al. |
| 2009/0166123 | A1 | 7/2009 | Luo et al. |
| 2009/0171522 | A1 | 7/2009 | Luo et al. |
| 2009/0171523 | A1 | 7/2009 | Luo et al. |
| 2010/0116571 | A1* | 5/2010 | Suzuki .................... B60L 53/16 |
| | | | 903/951 |
| 2018/0222307 | A1 | 8/2018 | Fujiyoshi et al. |
| 2018/0345820 | A1 | 12/2018 | Hatami |
| 2020/0156456 | A1 | 5/2020 | Marukawa et al. |
| 2021/0379979 | A1 | 12/2021 | Toda et al. |

FOREIGN PATENT DOCUMENTS

| | | | |
|---|---|---|---|
| JP | 2000-045779 | A | 2/2000 |
| JP | 2018-127124 | A | 8/2018 |
| JP | 2018-207591 | A | 12/2018 |
| JP | 2020-082863 | A | 6/2020 |
| JP | 2020-138718 | A | 9/2020 |
| JP | 2021-079765 | A | 5/2021 |

* cited by examiner

FIG.4

VERTICAL DIRECTION

UP

FRONT ← → REAR

LONGITUDINAL DIRECTION

DOWN

FIG.5

ELECTRIC VEHICLE

This application claims priority from Japanese Patent Application No. 2023-017967 filed on Feb. 8, 2023, the disclosure of which is herein incorporated by reference in its entirety.

FIELD OF THE INVENTION

The present invention relates to an electric vehicle provided with a charger.

BACKGROUND OF THE INVENTION

There is well-known an electric vehicle that includes: a drive wheel; an engine; an electric motor; a power transmission device configured to transmit a power of the electric motor to the drive wheel; a driving battery; and an electric-power control device configured to control an electric power transferred between the driving battery and the electric motor. A hybrid electric vehicle disclosed in JP-2021-79765A is an example of such an electric vehicle. In the hybrid electric vehicle disclosed in the Japanese Patent Application Publication, the engine, a driving apparatus and the electric-power control device are disposed within an engine compartment, wherein the driving apparatus includes the electric motor and the power transmission device, such that the engine and the driving apparatus are connected to each other and are located adjacent to each other in a width direction of the vehicle, and such that the electric-power control device is fixed onto an upper surface of the driving apparatus.

SUMMARY OF THE INVENTION

By the way, there is also well-known an electric vehicle provided with a charger configured to charge a driving battery with an electric power supplied from an external power supply. In such an electric vehicle, it might be possible to dispose the charger within the engine compartment. However, where the engine, the driving apparatus and the electric-power control device are disposed within the engine compartment, they require a large space thereby causing a risk that the charger could not be disposed within the engine compartment.

The present invention was made in view of the background art described above. It is therefore an object of the present invention to provide an electric vehicle in which a charger can be disposed together with an engine, a driving apparatus and an electric-power control device within an engine compartment.

The object indicated above is achieved according to the following aspects of the present invention.

According to a first aspect of the invention, there is provided an electric vehicle including: (a) a drive wheel; (b) an intake device provided upstream of an intake pipe of the engine (in a direction of air flow in the intake pipe); (c) an electric motor; (d) a power transmission device configured to transmit a power of the electric motor to the drive wheel; (e) a driving battery; (f) an electric-power control device configured to control an electric power transferred between the driving battery and the electric motor; and (g) a charger configured to charge the driving battery with the electric power supplied from an external power supply. The electric motor and the power transmission device constitute at least a part of a driving apparatus. The driving apparatus and the electric-power control device constitute a mechanical-electrical integrated unit which is housed in a single casing and which is located in a position adjacent to the engine. The charger is located on an upper side of the mechanical-electrical integrated unit in a vertical direction of the electric vehicle. The intake pipe is located on the upper side of the mechanical-electrical integrated unit in the vertical direction.

According to a second aspect of the invention, in the electric vehicle according to the first aspect of the invention, the engine includes a supercharger, wherein the intake pipe includes a portion which is located downstream of the intake device (in the direction of the air flow in the intake pipe) and upstream of the supercharger (in the direction of the air flow in the intake pipe), and wherein the portion of the intake pipe is located on an upper side of the mechanical-electrical integrated unit in the vertical direction.

According to a third aspect of the invention, in the electric vehicle according to the first aspect of the invention, the intake pipe is located on an upper side of the charger in the vertical direction.

According to a fourth aspect of the invention, in the electric vehicle according to the third aspect of the invention, the engine includes a supercharger, wherein the intake pipe includes a portion which is located downstream of the intake device and upstream of the supercharger, and wherein the portion of the intake pipe is located on the upper side of the charger in the vertical direction.

According to a fifth aspect of the invention, in the electric vehicle according to any one of the first through fourth aspects of the invention, the intake device is located on one of opposite sides of the charger which is remote from the engine in a width direction of the electric vehicle.

According to a sixth aspect of the invention, in the electric vehicle according to any one of the first through fifth aspects of the invention, the intake device is located on a front side of the charger in a longitudinal direction of the electric vehicle.

According to a seventh aspect of the invention, in the electric vehicle according to any one of the first through sixth aspects of the invention, the electric-power control device is located on an upper side of the driving apparatus in the vertical direction, wherein a lower portion of the electric-power control device in the vertical direction and an upper portion of the driving apparatus in the vertical direction are located in respective positions overlapping with each other as seen in a horizontal direction of the electric vehicle.

In the electric vehicle according to the first aspect of the invention, the driving apparatus, which includes the electric motor and the power transmission device, and the electric-power control device constitute the mechanical-electrical integrated unit which is housed in the single casing (i.e, same casing) and which is located in the position adjacent to the engine. Thus, a space is created on the upper side of the mechanical-electrical integrated unit within an engine compartment in the vertical direction. When being installed in the electric vehicle, the charger and the intake pipe are located on the upper side of the mechanical-electrical integrated unit in the vertical direction. That is, the charger and the intake pipe can be located in the space that is created on the upper side of the mechanical-electrical integrated unit within the engine compartment. Therefore, the charger, together with the engine, driving apparatus and electric-power control device, can be located within the engine compartment.

In the electric vehicle according to the second aspect of the invention, the portion of the intake pipe, which is located downstream of the intake device and upstream of the supercharger of the engine, is located on the upper side of the mechanical-electrical integrated unit in the vertical direction. Therefore, the charger, together with the engine (including the supercharger), driving apparatus and electric-power control device, can be located within the engine compartment.

In the electric vehicle according to the third aspect of the invention, the intake pipe is located on the upper side of the charger in the vertical direction. That is, the charger and the intake pipe can be appropriately located in the space created on the upper side of the mechanical-electrical integrated unit within the engine compartment.

In the electric vehicle according to the fourth aspect of the invention, the portion of the intake pipe, which is located downstream of the intake device and upstream of the supercharger, is located on the upper side of the charger in the vertical direction. Thus, the charger, together with the engine (including the supercharger), driving apparatus and electric-power control device, can be appropriately located within the engine compartment.

In the electric vehicle according to the fifth aspect of the invention, the intake device is located on one of the opposite sides of the charger which is remote from the engine in the width direction of the electric vehicle. Thus, in the event of a side collision of the electric vehicle in the width direction, the intake device is first deformed whereby the charger can be protected from a collision load in the width direction.

In the electric vehicle according to the sixth aspect of the invention, the intake device is located on the front side of the charger in the longitudinal direction of the electric vehicle. Thus, in the event of a frontal collision of the electric vehicle, the intake device is first deformed whereby the charger can be protected from a collision load from front of the electric vehicle.

In the electric vehicle according to the seventh aspect of the invention, the electric-power control device is located on the upper side of the driving apparatus in the vertical direction, and the lower portion of the electric-power control device in the vertical direction and the upper portion of the driving apparatus in the vertical direction are located in the respective positions overlapping with each other as seen in the horizontal direction of the electric vehicle. Owing to these arrangements, it is possible to appropriately reduce a dimension of the mechanical-electrical integrated unit in the vertical direction, so that a space is created on the upper side of the mechanical-electrical integrated unit within the engine compartment.

BRIEF DESCRIPTION OF THE DRAWINGS

FIG. 4 is a view schematically showing a construction of a mechanical-electrical integrated unit;

FIG. 5 is a view showing, by way of examples, positions of respective components of a driving apparatus;

DETAILED DESCRIPTION OF PREFERRED EMBODIMENTS

Hereinafter, there will be described preferred embodiments in detail with reference to the accompanying drawings.

First Embodiment

Figure 1:
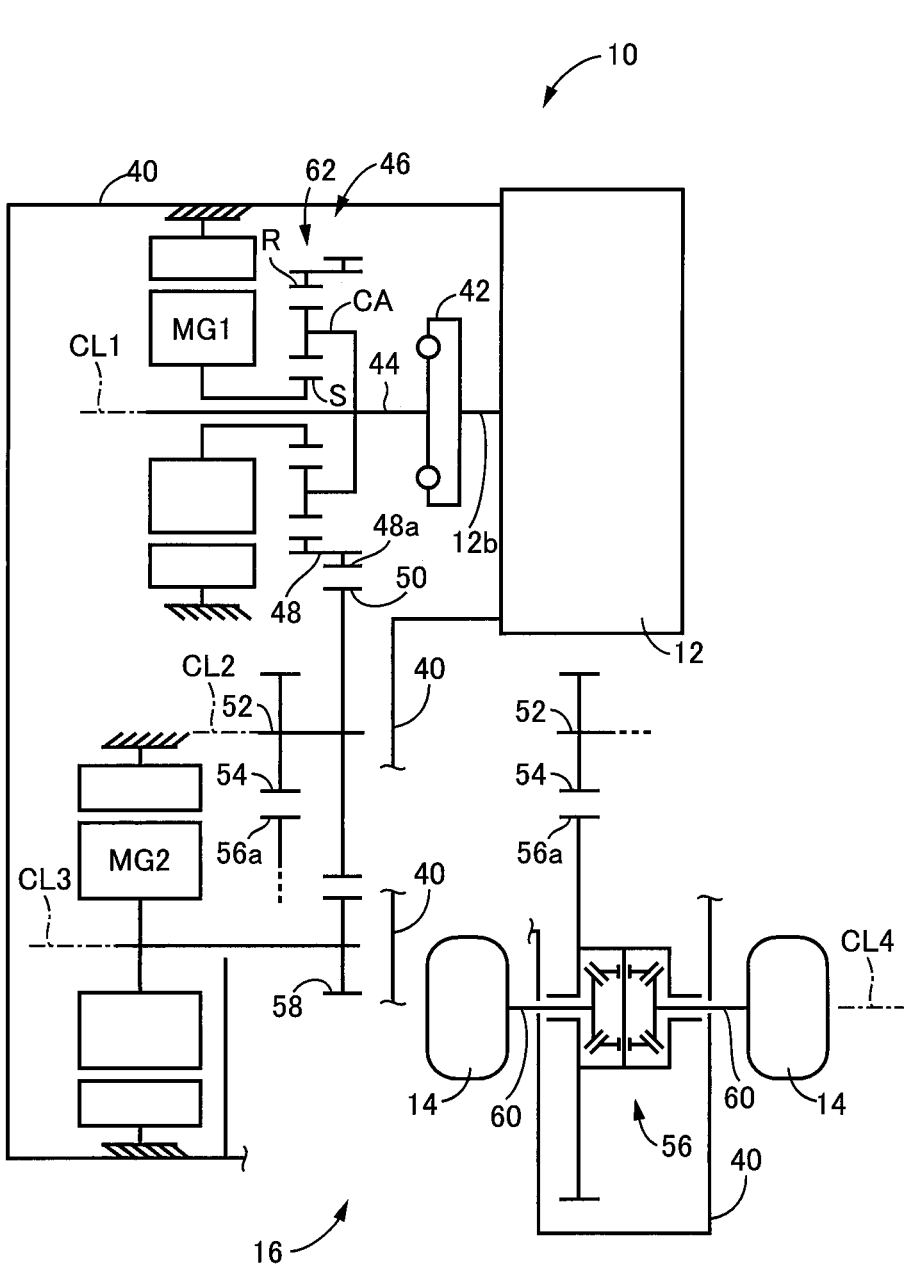
FIG. 1 is a view schematically showing a construction of an electric vehicle to which the present invention is applied.

FIG. 1 is a view schematically showing a construction of an electric vehicle 10 to which the present invention is applied. As shown in FIG. 1, the electric vehicle 10 (hereinafter simply referred to as "vehicle 10") is a hybrid electric vehicle including an engine 12 that functions as a power source and a second electric motor MG2 as an electric motor that functions as another power source. The vehicle 10 further includes drive wheels 14, a power transmission device 16 and a first electric motor MG1.

Figure 2:
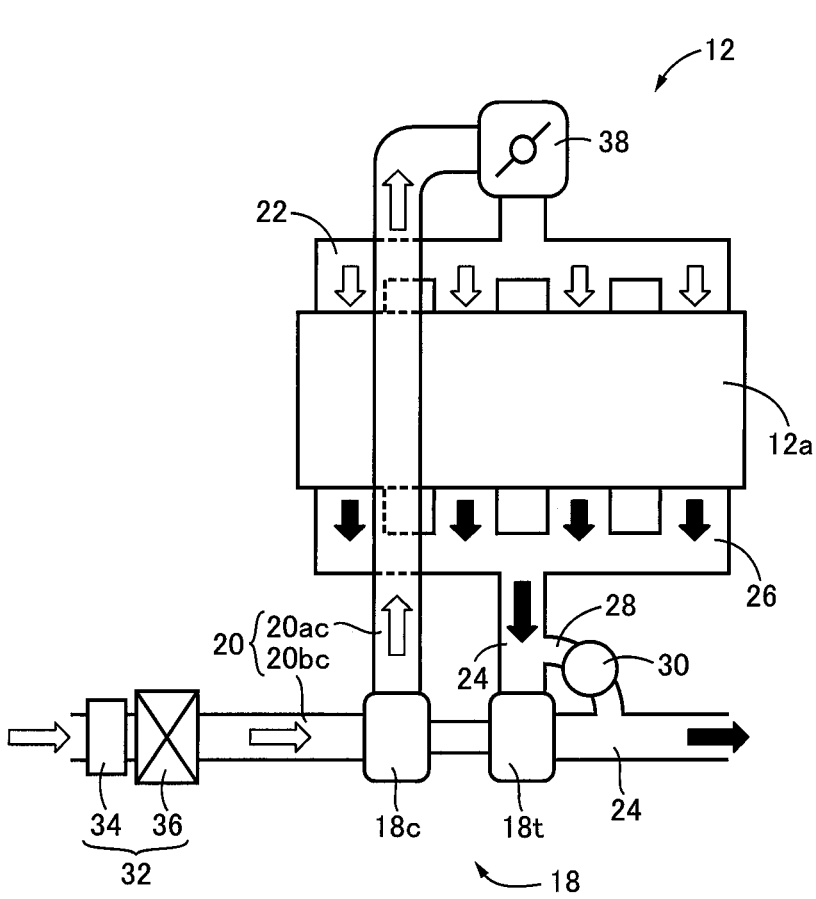
FIG. 2 is a view schematically showing a construction of an engine.

FIG. 2 is a view schematically showing a construction of the engine 12 that is a known internal combustion engine including a supercharger 18, i.e., a known engine with the supercharger 18. An intake system of the engine 12 is provided with an intake pipe 20. The intake pipe 20 is connected to an intake manifold 22 that is attached to an engine main body 12a. An exhaust system of the engine 12 is provided with an exhaust pipe 24. The exhaust pipe 24 is connected to an exhaust manifold 26 that is attached to the engine main body 12a. The "intake pipe" is synonymous with "intake duct", while the "exhaust pipe" is synonymous with "exhaust duct".

The supercharger 18 is a known exhaust-turbine type supercharger, i.e., a turbo charger, which includes a compressor 18c provided in the intake pipe 20 and a turbine 18t provided in the exhaust pipe 24. The turbine 18t is to be rotationally driven by an exhaust gas, i.e., exhaust flow. The compressor 18c is connected to the turbine 18t, so as to be rotationally driven by the turbine 18t, for compressing an intake, i.e., air taken into the engine 12.

The exhaust pipe 24 is provided with an exhaust bypass 28 in parallel to bypass the turbine 18t and cause an exhaust to flow from an upstream side of the turbine 18t to a downstream side of the turbine 18t. The exhaust bypass 28 is provided with a waste gate valve 30 for continuously controlling a ratio between the exhaust passing through the turbine 18t and the exhaust passing through the exhaust bypass 28.

An intake device 32 is provided upstream of the intake pipe 20, particularly, upstream of the supercharger 18 (compressor 18*c*), namely, at an inlet of the intake pipe 20. The intake device 32 includes a resonator 34 and an air cleaner 36. The resonator 34 is provided upstream of the air cleaner 36. An electronic throttle valve 38 is provided in a portion of the intake pipe 20, which is downstream of the compressor 18*c* and upstream of the intake manifold 22. In the present embodiment, a portion of the intake pipe 20 which is located downstream of the intake device 32 (for example, the air cleaner 36) and upstream of the supercharger 18, will be referred to as a pre-supercharger intake pipe 20*bc*. Further, in the present embodiment, a portion of the intake pipe 20 which is located downstream of the supercharger 18 and upstream of the intake manifold 22, will be referred to as a post-supercharger intake pipe 20*ac*.

Referring back to FIG. 1, each of the first and second electric motors MG1, MG2 is a so-called "motor generator" that is a known rotary electric machine having a function serving as a motor configured to generate a mechanical power from an electric power and a function serving as a generator configured to generate the electric power from the mechanical power. The first and second electric motors MG1, MG2 are disposed within a casing 40 as a non-rotary member that is unrotatably attached to a body of the vehicle 10.

The power transmission device 16 is disposed in a power transmission path between the engine 12 and the drive wheels 14 and in a power transmission path between the second electric motor MG2 and the drive wheels 14. The power transmission device 16 includes a damper 42, an input shaft 44, a transmission portion 46, a composite gear 48, a driven gear 50, a driven shaft 52, a final gear 54, a differential gear device 56 and a reduction gear 58 that are disposed within the casing 40. The input shaft 44 functions as an input rotary member of the transmission portion 46, and is connected to a crankshaft 12*b* of the engine 12 through the damper 42, for example. The transmission portion 46 is connected to the input shaft 44. The composite gear 48 is an output-side rotary body of the transmission portion 46. The composite gear 48 includes a drive gear 48*a* that is provided in a portion of an outer circumferential surface of the composite gear 48. The drive gear 48*a* is an output rotary member of the transmission portion 46. The driven gear 50 meshes with the drive gear 48*a*. The driven gear 50 and the final gear 54 are fixed on the driven shaft 52, so as to be unrotatable relative to each other. The final gear 54 has a diameter smaller than a diameter of the driven gear 50, and meshes with a differential ring gear 56*a* of the differential gear device 56. The reduction gear 58 has a diameter smaller than the diameter of the driven gear 50, and meshes with the driven gear 50. The second electric motor MG2 includes a rotor shaft connected to the reduction gear 58, so as to be connected to the reduction gear 58 in a power transmittable manner. The power transmission device 16 further includes a pair of drive shafts 60 connected to the differential gear device 56.

The power transmission device 16, which is constructed as described above, is advantageously used in a vehicle of FF (front engine and front drive) system or RR (rear engine and rear drive) system. The power transmission device 16 is configured to transmit a power outputted from the engine 12, to the driven gear 50 through the transmission portion 46, and is configured to transmit a power outputted from the second electric motor MG2, to the driven gear 50 through the reduction gear 58. The power transmission device 16 is then configured to transmit the power transmitted to the driven gear 50, to the drive wheels 14 sequentially through the driven shaft 52, final gear 54, differential gear device 56 and drive shafts 60, for example. The driven gear 50, driven shaft 52 and final gear 54 constitute a transmission unit configured to transmit the power of the second electric motor MG2 to the differential gear device 56 and to transmit the power transmitted from the drive gear 48*a*, to the differential gear device 56. The differential gear device 56 is a device configured to distribute the power transmitted through the driven gear 50, driven shaft 52 and final gear 54, to the drive wheels 14.

The power transmission device 16 has four axes, i.e., a first axis CL1, a second axis CL2, a third axis CL3 and a fourth axis CL4 that are parallel to one another. The first axis CL1 is an axis of the input shaft 44 and also an axis of the rotor shaft of the first electric motor MG1. That is, the first axis CL1 is a rotational axis of the first electric motor MG1. The transmission portion 46 and the first electric motor MG1 are disposed around the first axis CL1. That is, the drive gear 48*a* of the transmission portion 46 is coaxial with the first electric motor MG1. The second axis CL2 is an axis of the driven shaft 52. The driven gear 50 and the final gear 54 are disposed around the second axis CL2. That is, the second axis CL2 is a rotational axis of each of the driven gear 50, driven shaft 52 and final gear 54. The third axis CL3 is an axis of the rotor shaft of the second electric motor MG2. That is, the third axis CL3 is a rotational axis of the second electric motor MG2. The second electric motor MG2 and the reduction gear 58 are disposed around the third axis CL3. The fourth axis CL4 is an axis of each of the drive shafts 60 and also an axis of the differential gear device 56. That is, the fourth axis CL4 is a rotational axis of the differential gear device 56. The differential gear device 56 is disposed around the fourth axis CL4.

The transmission portion 46 includes the first electric motor MG1 and a differential mechanism 62. The differential mechanism 62 is constituted by a known planetary gear device of single pinion type, and includes a sun gear S, a carrier CA and a ring gear R. The sun gear S is connected to the rotor shaft of the first electric motor MG1, so that the first electric motor MG1 is connected to the sun gear S in a power transmittable manner. The carrier CA is connected to the input shaft 44, so that the engine 12 is connected to the carrier CA through the input shaft 44, for example, in a power transmittable manner. The ring gear R is provided in a part of an inner circumferential surface of the composite gear 48, so as to be connected integrally with the drive gear 48*a*.

The differential mechanism 62, to which the engine 12 is connected in a power transmittable manner, is configured to produce a differential action. The first electric motor MG1 is a differential electric motor connected to the differential mechanism 62 in a power transmittable manner. The differential mechanism 62 is a power split mechanism configured to mechanically split the power of the engine 12, which is inputted to the carrier CA, into the first electric motor MG1 and the drive gear 48*a*. The transmission portion 46 is a known electric transmission mechanism in which a differential state of the differential mechanism 62 is controlled with an operation state of the first electric motor MG1 being controlled.

Figure 3:
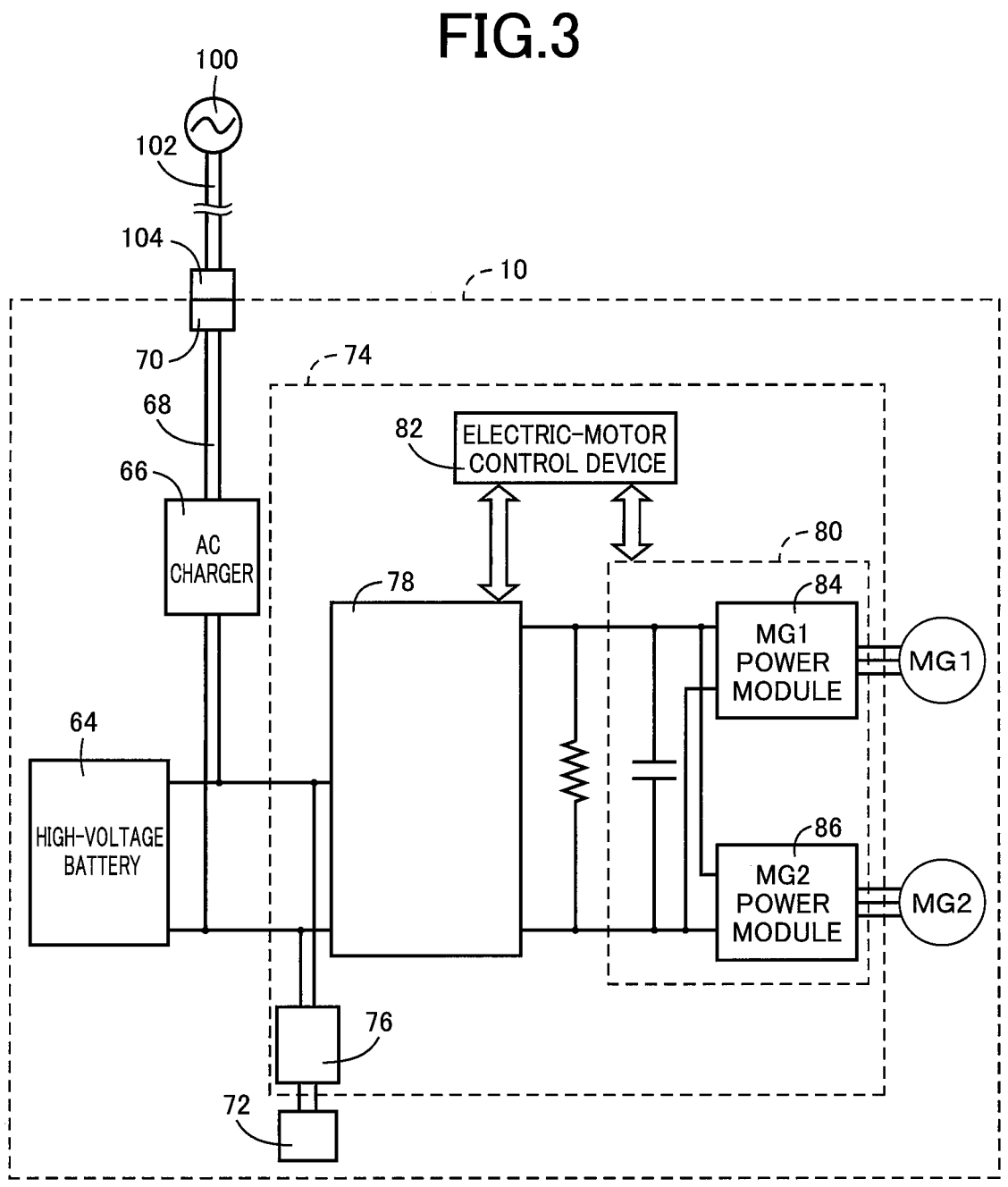
FIG. 3 is a view showing an example of an electrical configuration related to controls of electric motors.

FIG. 3 is a view showing an example of an electrical configuration related to controls of the first and second electric motors MG1, MG2. As shown in FIG. 3, the vehicle 10 further includes a high-voltage battery 64, an AC charger 66, an in-vehicle charging cable 68, a charging inlet 70, an auxiliary battery 72 and an electric-power control unit 74.

The high-voltage battery 64 is a DC power source that is chargeable and dischargeable, and is a secondary battery constituted by a nickel-hydrogen battery or a lithium-ion battery, for example. The high-voltage battery 64 is connected to the electric-power control unit 74 and also to the AC charger 66. The AC charger 66 is connected to the charging inlet 70 through the in-vehicle charging cable 68. The charging inlet 70 is attached to a body of the vehicle 10, so as to be connectable to a charging connector 104 of an external charging cable 102 connected to an external power supply 100 for the vehicle 10. The charging inlet 70 is a terminal that is to be connected to the charging connector 104 such that the electric power supplied from the external power supply 100 is to be inputted to the charging inlet 70. The charging inlet 70 is a charging port that is to be connected to the external power supply 100.

The AC charger 66 is a charger configured to charge the high-voltage battery 64 with the electric power supplied from the external power supply 100. The AC charger 66 converts an alternating current of the electric power supplied from the external power supply 100 into a direct current, increases a voltage of the supplied electric power to the same level of a voltage of the high-voltage battery 64, and charges the high-voltage battery 64.

The stored electric power is supplied from the high-voltage battery 64 to, for example, the second electric motor MG2 through the electric-power control unit 74. In addition, the high-voltage battery 64 is supplied with the electric power generated by a power generation control of the first electric motor MG1 and the electric power regenerated by a regeneration control of the second electric motor MG2 through the electric-power control unit 74. Also, when the charging connector 104 connected to the external power supply 100 is connected to the charging inlet 70, the electric power is supplied from the external power supply 100 to the high-voltage battery 64 through the AC charger 66, for example. The vehicle 10 is a so-called "plug-in hybrid vehicle" that can charge the high-voltage battery 64 with the electric power supplied from the external power supply 100. The high-voltage battery 64 corresponds to "driving battery" recited in the appended claims.

The electric-power control unit 74 includes a DCDC converter 76, a boost converter 78, an inverter 80 and an electric-motor control device 82. The electric-power control unit 74 is an electric-power control device configured to control the electric power transferred between the high-voltage battery 64 and each of the first and second electric motors MG1, MG2.

The DCDC converter 76 is connected to the high-voltage battery 64. The DCDC converter 76 functions as a charging device configured to charge the auxiliary battery 72 by reducing a voltage of the high-voltage battery 64 to a voltage equivalent to that of the auxiliary battery 72. The auxiliary battery 72 is configured to supply the electric power to operate auxiliary devices provided in the vehicle 10. The auxiliary battery 72 is configured to supply the electric power to operate the electric-motor control device 82 and an electronic control device that is provided in the vehicle 10.

The boost converter 78 includes reactors and switching elements (not shown). The boost converter 78 is a voltage boosting/dropping circuit having a function of increasing the voltage of the high-voltage battery 64 and supplying the increased voltage to the inverter 80 and also a function of reducing the voltage converted to DC by the inverter 80 and supplying the converted voltage to the high-voltage battery 64.

The inverter 80 includes an MG1 power module 84 and an MG2 power module 86, each of which includes switching elements (not shown). The inverter 80 is configured to convert the direct current supplied from the boost converter 78, into the alternating current for driving the first and second electric motors MG1, MG2, and is configured to converts the alternating current generated by the first electric motor MG1 using the power of engine 12 and generated by the second electric motor MG2 using a regenerative brake, into the direct current. Further, the inverter 80 is configured to supply the alternating current generated by the first electric motor MG1 as a drive power for the second electric motor MG2, depending on a driving condition of the vehicle 10.

The electric-motor control device 82 is configured to control the boost converter 78 and the inverter 80. For example, the electric-motor control device 82 converts the direct current supplied from the high-voltage battery 64, into the alternating current for driving the first and second electric motors MG1, MG2. The electric-motor control device 82 drives the first electric motor MG1, for thereby obtaining the electric power required to supply the electric power to the second electric motor MG2 and to charge the high-voltage battery 64. The electric-motor control device 82 drives the second electric motor MG2, based on an output request value that is dependent on a torque required by a driver of the vehicle 10. The electric-motor control device 82 causes the second electric motor MG2 to function as the generator, depending on a required regenerative braking amount.

Figure 4:
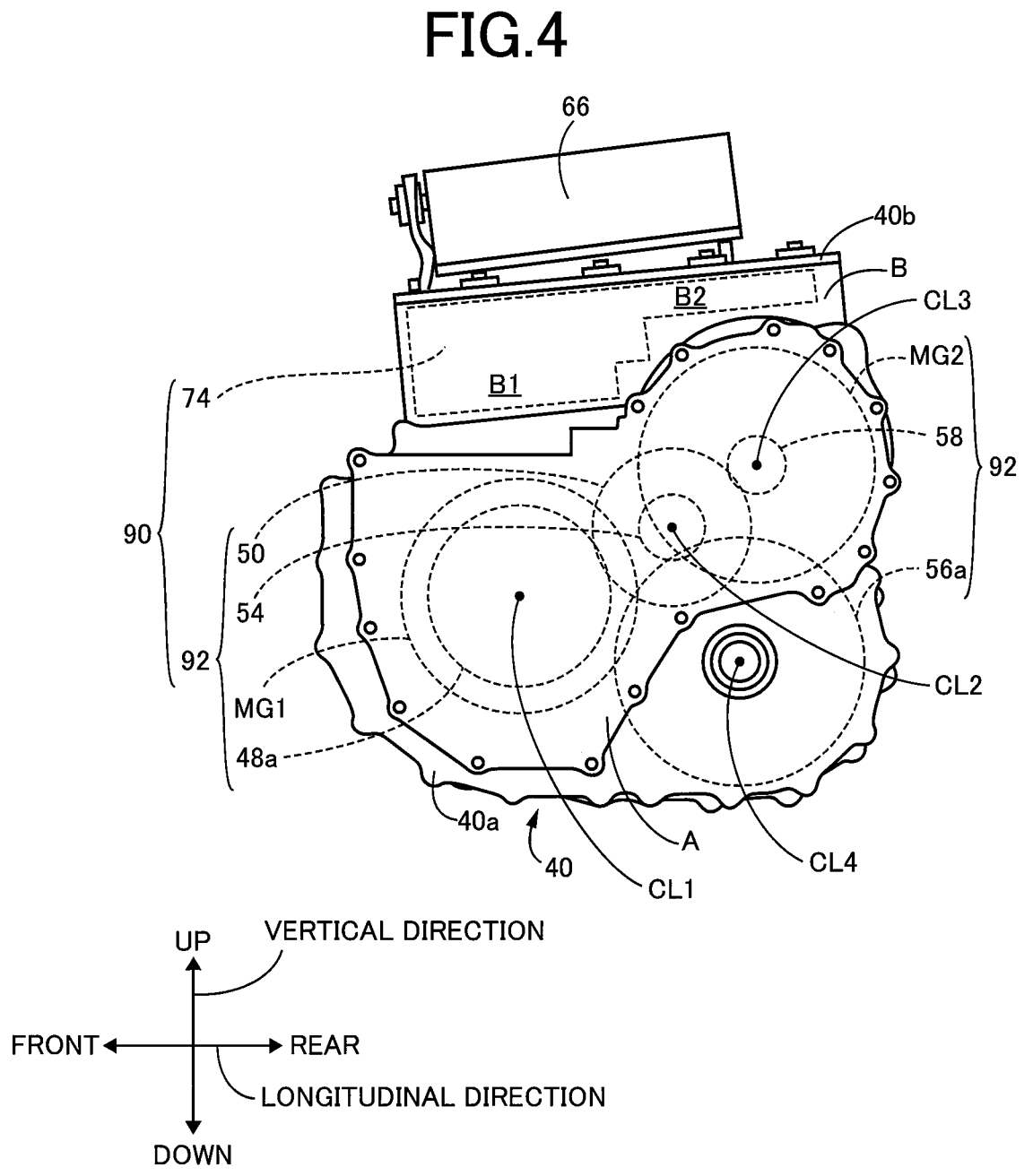

FIG. 4 is a view schematically showing a construction of a hybrid drive unit 90. As shown in FIG. 4, the hybrid drive unit 90 is constituted by a transaxle 92 and the electric-power control unit 74 that are housed in the same casing 40. The hybrid drive unit 90 is a mechanical-electrical integrated unit, i.e., a unit in which the transaxle 92 and the electric-power control unit 74 are integrated to each other.

The casing 40 includes a main body 40*a* and a cover plate 40*b*. The main body 40*a* has a bottom wall and a side wall that extends from an outer periphery of the bottom wall upwardly in a vertical direction, and opens upwardly in the vertical direction. The cover plate 40*b* is a plate member provided to cover the opening of the main body 40*a*. The main body 40*a* has a partition wall (not shown) by which an interior of the main body 40*a* is sectioned into two spaces consisting of a vertically lower space A and a vertically upper space B. It is noted that "VERTICAL DIRECTION", "LONGITUDINAL DIRECTION" and "WIDTH DIRECTION" in FIGS. 4-7, 9 and 11 indicate a vertical direction, a longitudinal direction and a width direction of the vehicle 10, respectively.

The transaxle 92 is a driving apparatus that includes the power transmission device 16 (including the drive gear 48*a*, driven gear 50, final gear 54, differential ring gear 56*a* and reduction gear 58, for example) and the first and second electric motors MG1, MG2. The transaxle 92 is housed in the vertically lower space A of the main body 40*a* of the casing 40, when being installed in the vehicle 10.

The electric-power control unit 74 is housed in the vertically upper space B of the main body 40*a* of the casing 40, when being installed in the vehicle 10. The vertically upper space B includes a surplus space B1 created by arrangement of the first and second electric motors MG1, MG2, and a space B2 located on an upper side of the second electric motor MG2 in the vertical direction of the vehicle 10. The surplus space B1 has a shorter length in the longitudinal direction of the vehicle 10 than the space B2.

Figure 5:
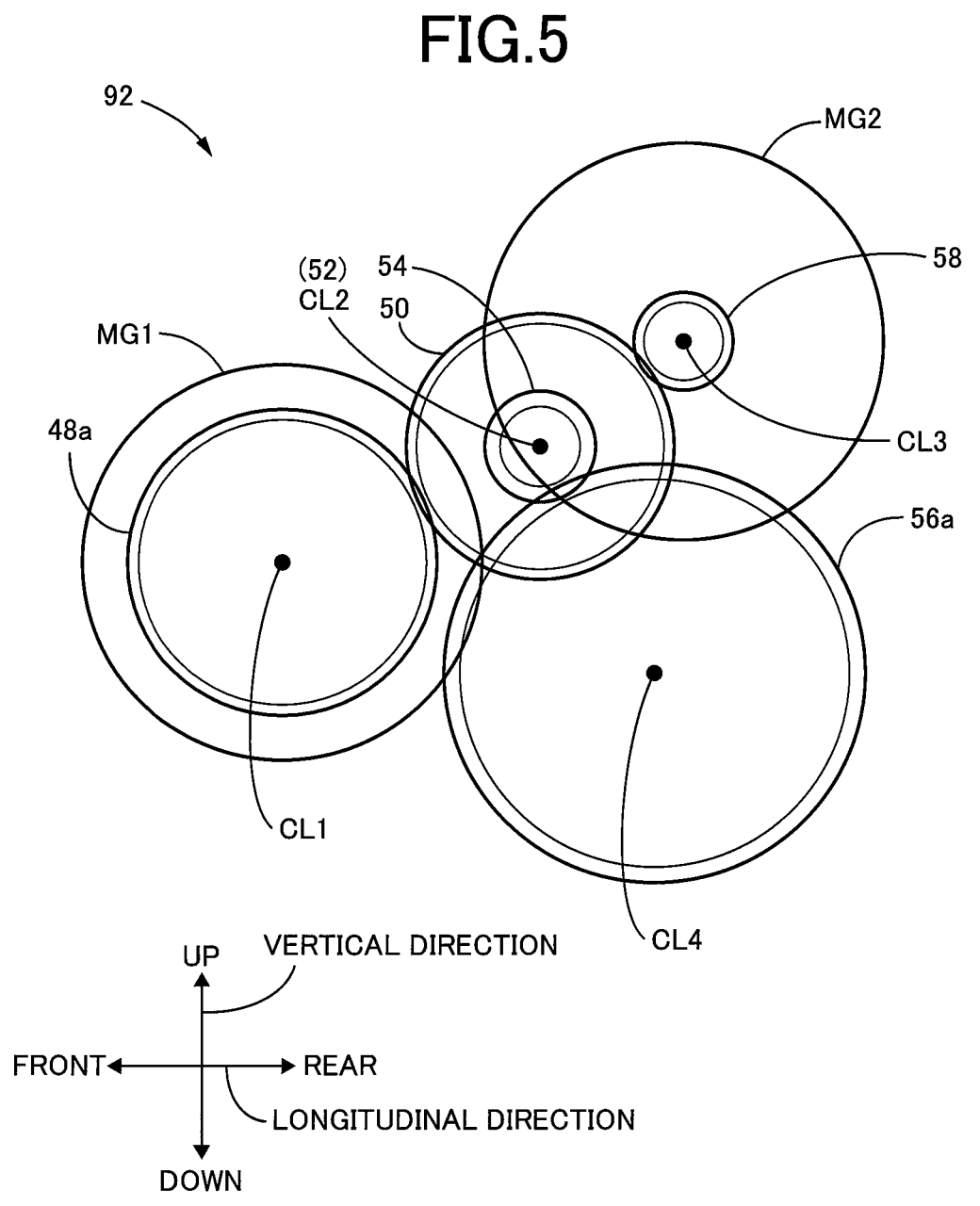

FIG. 5 is a view showing, by way of examples, positions of respective components of the transaxle 92. As shown in FIG. 5, when the transaxle 92 is installed in the vehicle 10, the first, second, third and fourth axes CL1, CL2, CL3, CL4 are parallel to a horizontal direction perpendicular to the longitudinal direction of the vehicle 10. Further, when the transaxle 92 is installed in the vehicle 10, the first, second, third and fourth axes CL1, CL2, CL3, CL4 are located in respective positions, such that the second electric motor MG2, driven shaft 52, first electric motor MG1 and differential gear device 56 are arranged in this order of description from top to bottom in the vertical direction of the vehicle 10, and such that the first electric motor MG1, driven shaft 52, differential gear device 56 and second electric motor MG2 are arranged in this order of description from front to rear in the longitudinal direction of the vehicle 10. Owing to this arrangement, distances among the first, second, third and fourth axes CL1, CL2, CL3, CL4 are appropriately ensured, and a dimension of the transaxle 92 in the vertical direction is reduced. Therefore, the surplus space B1 is created by the arrangement of the first and second electric motors MG1, MG2, and the space B2 is created on the upper side of the second electric motor MG2 in the vertical direction (see FIG. 4). The electric-power control unit 74 is provided in the space B (B1+B2) consisting of the spaces B1, B2 (see FIG. 4).

As shown in FIG. 4, when being installed in the vehicle 10, the electric-power control unit 74 is located on the upper side of the transaxle 92 in the vertical direction. Further, a lower portion of the electric-power control unit 74 in the vertical direction and an upper portion of the transaxle 92, particularly, an upper portion of the second electric motor MG2, in the vertical direction are located in respective positions overlapping with each other as seen in the horizontal direction, particularly, as seen in the longitudinal direction. In other words, when the electric-power control unit 74 is installed in the vehicle 10, the lower portion of the electric-power control unit 74 is located on an upper side of the first electric motor MG1 in the vertical direction.

The electric-power control unit 74 is provided in a space created by the reduction of the dimension of the transaxle 92 in the vertical direction, and a space is created on the upper side of the hybrid drive unit 90 in the vertical direction. As shown in FIG. 4, when being installed in the vehicle 10, the AC charger 66 is provided in the space created on the upper side of the hybrid drive unit 90. That is, when being installed in the vehicle 10, the AC charger 66 is located on the upper side of the hybrid drive unit 90 in the vertical direction.

The transaxle 92 and the electric-power control unit 74, which cooperate with each other to constitute the hybrid drive unit 90, are located in located in respective positions adjacent to each other. Therefore, it is necessary to consider position of the intake pipe 20, for example, within an engine compartment 94 (see FIG. 8).

Figure 6:
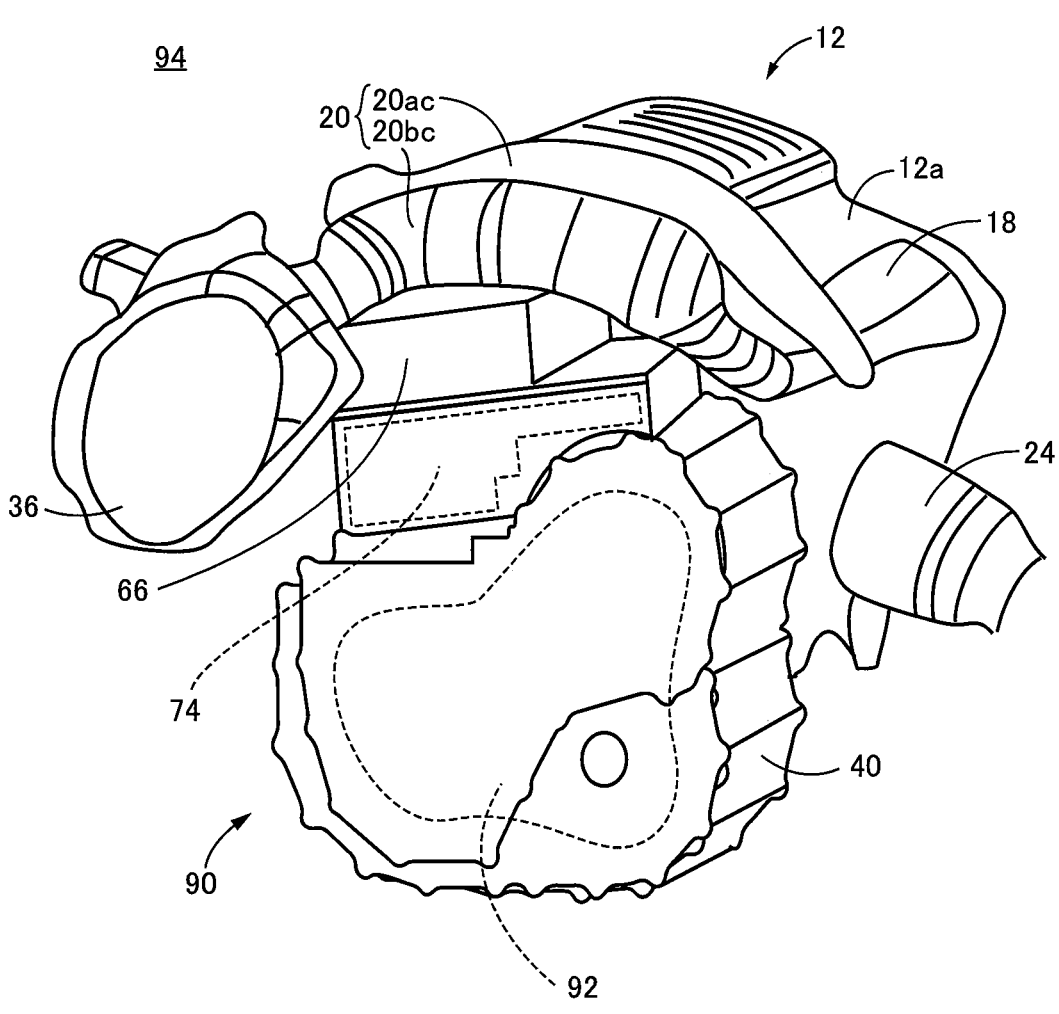
FIG. 6 is a side view showing, by way of examples, positions of an intake pipe and other components within an engine compartment, wherein the side view is as seen from generally a left side of the electric vehicle.
Figure 6:
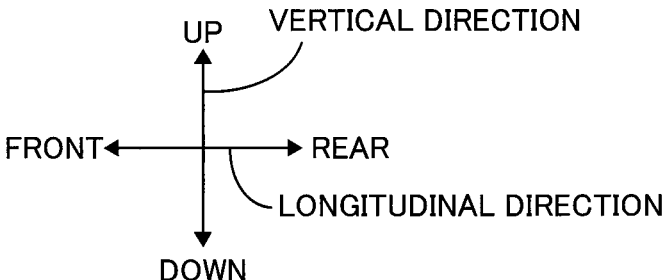
Figure 7:
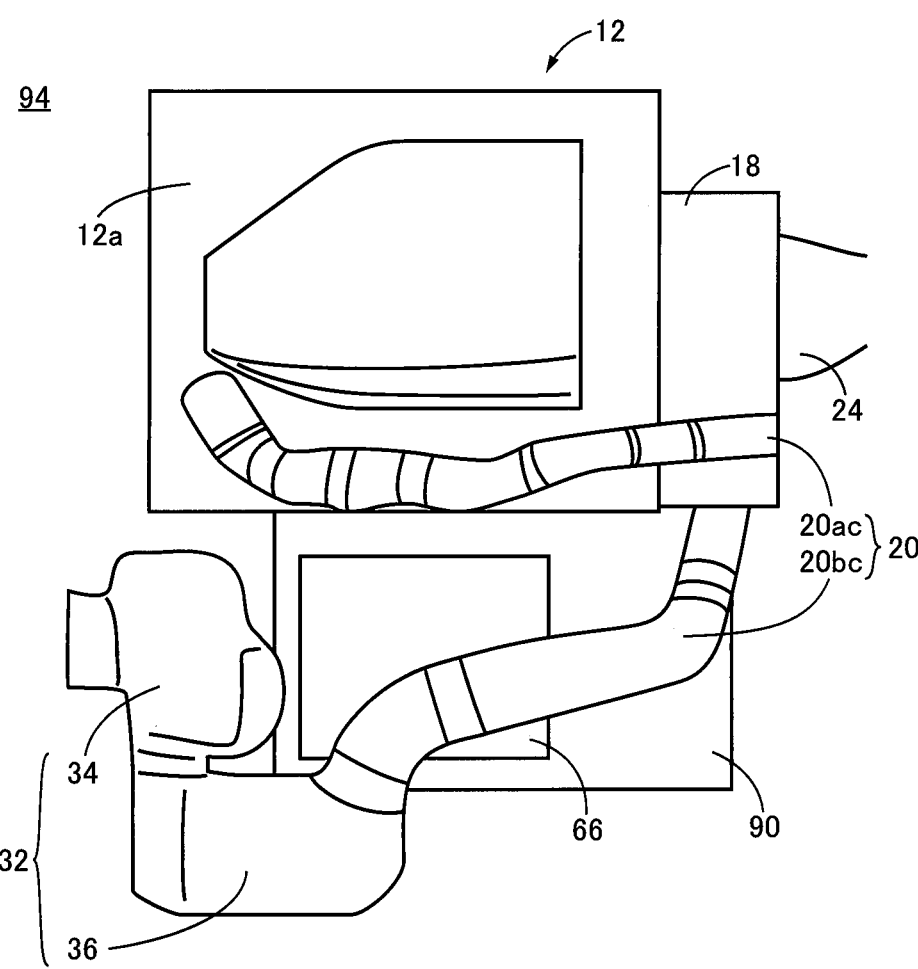
FIG. 7 is a plan view showing, by way of examples, positions of the intake pipe and other components within the engine compartment, wherein the plan view is as seen from an upper side of the electric vehicle.
Figure 7:
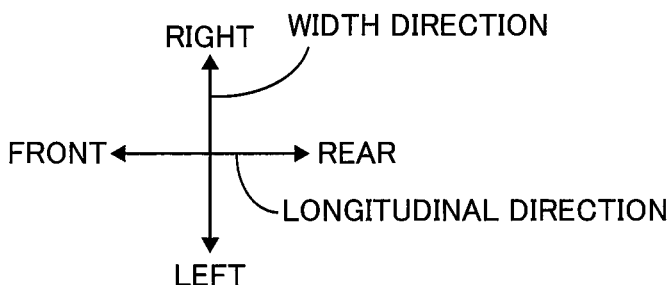

FIGS. 6 and 7 are views showing, by way of examples, positions of the intake pipe 20 and other components within the engine compartment 94. The view of FIG. 6 is a side view as seen from generally a left side of the vehicle 10. The view of FIG. 7 is a plan view as seen from an upper side of the vehicle 10.

As shown in FIGS. 6 and 7, when being installed in the vehicle 10, the intake pipe 20 is located in the space created on the upper side of the hybrid drive unit 90 in the vertical direction. That is, when being installed in the vehicle 10, the intake pipe 20 is located on the upper side of the hybrid drive unit 90 in the vertical direction. In the vehicle 10, the supercharger 18 is interposed in the intake pipe 20, so that the supercharger 18 is located on a rear side of the engine main body 12a in the longitudinal direction. When the intake pipe 20 is installed in the vehicle 10, the pre-supercharger intake pipe 20bc, which is the portion of the intake pipe 20 which is located downstream of the air cleaner 36 and upstream of the supercharger 18, is located on the upper side of the hybrid drive unit 90 in the vertical direction.

In the vehicle 10, the AC charger 66 is located on the upper side of the hybrid drive unit 90 in the vertical direction. In the event of a disaster such as a typhoon or earthquake, various falling objects may collide with the vehicle 10 from above. In this case, there is a risk that a large impact force could be applied to the AC charger 66 so as to damage the AC charger 66, so that it is desirable to protect the AC charger 66 from the impact applied from above. In the vehicle 10, the intake pipe 20 serves to protect the AC charger 66 from a collision load applied from above. To this end, when being installed in the vehicle 10, the intake pipe 20 is located on an upper side of the AC charger 66 in the vertical direction. In the vehicle 10, the supercharger 18 is interposed in the intake pipe 20. Thus, when the intake pipe 20 is installed in the vehicle 10, the above-described pre-supercharger intake pipe 20bc is located on the upper side of the AC charger 66 in the vertical direction. The intake pipe 20 passes above the AC charger 66 that is located on the upper side of the hybrid drive unit 90. Where the supercharger 18 is interposed in the intake pipe 20, the pre-supercharger intake pipe 20bc passes above the AC charger 66.

It is desirable to protect the AC charger 66 from a side collision of the vehicle 10 in the width direction. In the vehicle 10, the intake device 32 protects the AC charger 66 from the collision load in the event of the side collision of the vehicle 10. To this end, the intake device 32 (for example, the air cleaner 36) is located on one of opposite sides of the AC charger 66 that is remote from the engine 12 in the width direction of the vehicle 10.

It is desirable to protect the AC charger 66 from a frontal collision of the vehicle 10 in the longitudinal direction. In the vehicle 10, the intake device 32 protects the AC charger 66 from the collision load in the event of the frontal collision of the vehicle 10. To this end, the intake device 32 (for example, the resonator 34) is located on a front side of the AC charger 66 in the longitudinal direction of the vehicle 10.

Figure 8:
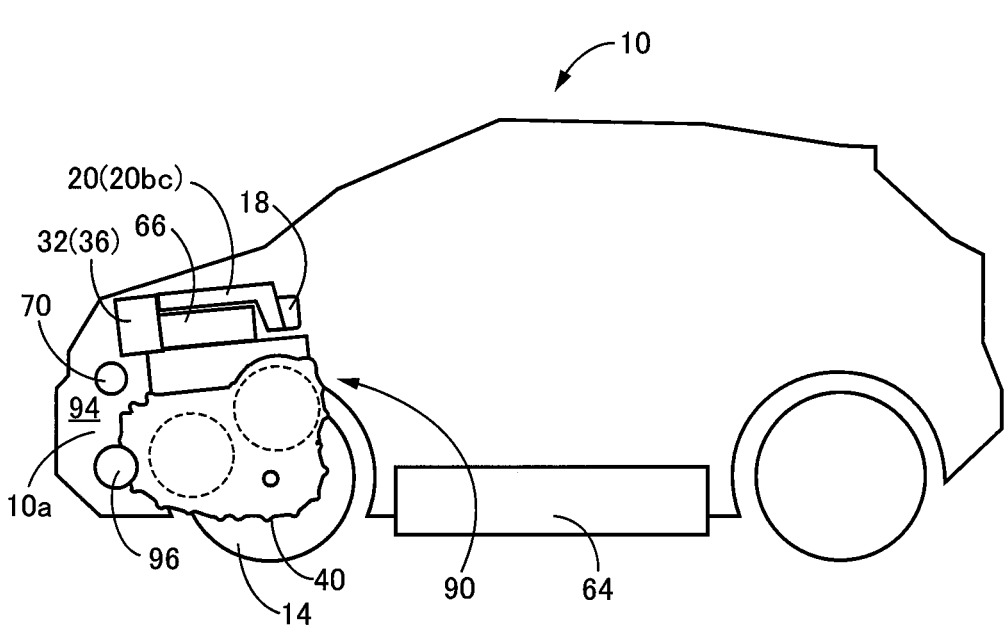
FIG. 8 is a view showing, by way of an example, a state in which the mechanical-electrical integrated unit, the AC charger and other components are installed in the electric vehicle.

FIG. 8 is a view showing, by way of an example, a state in which the hybrid drive unit 90, the AC charger 66 and other components are installed in the vehicle 10. As shown in FIG. 8, the hybrid drive unit 90 and the AC charger 66 are housed together with the engine 12, within the engine compartment 94. The engine compartment 94 is synonymous with an engine room in which the engine 12 is housed. The intake pipe 20 (pre-supercharger intake pipe 20bc) of the engine 12 is located on an upper side of the AC charger 66 in the vertical direction. Within the engine compartment 94, the intake device 32 (air cleaner 36) and a water pump 96 are also stored, for example. The high-voltage battery 64 is disposed on a lower side of an interior space of the vehicle 10 in the vertical direction.

Further, the vehicle 10 may include a charging inlet 70 provided in an outer plate 10a that defines the engine compartment 94. Owing to provision of the charging inlet 70, a length of the in-vehicle charging cable 68 can be reduced.

As described above, in the present embodiment, the transaxle 92 and the electric-power control unit 74 constitute the hybrid drive unit 90 which is housed in the single casing 40 (i.e, same casing 40) and which is located in the position adjacent to the engine 12. Thus, a space is created on the upper side of the hybrid drive unit 90 within the engine compartment 94 in the vertical direction. When being installed in the vehicle 10, the AC charger 66 and the intake pipe 20 are located on the upper side of the hybrid drive unit 90 in the vertical direction. That is, the AC charger 66 and the intake pipe 20 can be located in the space that is created on the upper side of the hybrid drive unit 90 within the engine compartment 94. Therefore, the AC charger 66, together with the engine 12, transaxle 92 and electric-power control unit 74, can be located within the engine compartment 94.

In the present embodiment, the pre-supercharger intake pipe 20bc is located on the upper side of the hybrid drive unit 90 in the vertical direction. Therefore, the AC charger 66, together with the engine 12 (including the supercharger 18), transaxle 92 and electric-power control unit 74, can be located within the engine compartment 94.

In the present embodiment, the intake pipe 20 is located on the upper side of the AC charger 66 in the vertical direction. That is, the AC charger 66 and the intake pipe 20 can be appropriately located in the space created on the upper side of the hybrid drive unit 90 within the engine compartment 94. Further, in the event of application of an impact from above the vehicle 10, the intake pipe 20 is first deformed whereby the AC charger 66 can be protected from a collision load from above the vehicle 10.

In the present embodiment, the pre-supercharger intake pipe 20bc is located on the upper side of the AC charger 66 in the vertical direction. Thus, the AC charger 66, together with the engine 12 (including the supercharger 18), transaxle 92 and electric-power control unit 74, can be appropriately located within the engine compartment 94. Further, in the event of application of an impact from above the vehicle 10, the pre-supercharger intake pipe 20bc is first deformed whereby the AC charger 66 can be protected from a collision load from above the vehicle 10.

In the present embodiment, the intake device 32 is located on one of the opposite sides of the AC charger 66 which is remote from the engine 12 in the width direction of the vehicle 10. Thus, in the event of a side collision of the vehicle 10 in the width direction, the intake device 32 is first deformed whereby the AC charger 66 can be protected from a collision load in the width direction.

In the present embodiment, the intake device 32 is located on the front side of the AC charger 66 in the longitudinal direction of the vehicle 10. Thus, in the event of a frontal collision of the vehicle 10, the intake device 32 is first deformed whereby the AC charger 66 can be protected from a collision load from front of the vehicle 10.

In the present embodiment, the electric-power control unit 74 is located on the upper side of the transaxle 92 in the vertical direction, and the lower portion of the electric-power control unit 74 in the vertical direction and the upper portion of the transaxle 92 in the vertical direction are located in the respective positions overlapping with each other as seen in the horizontal direction of the vehicle 10. Owing to these arrangements, it is possible to appropriately reduce a dimension of the hybrid drive unit 90 in the vertical direction, so that a space is created on the upper side of the hybrid drive unit 90 within the engine compartment 94.

In the present embodiment, it is possible to increase a degree of freedom in a route of the intake pipe 20, and to improve intake efficiency. Further, it is possible to increase a degree of freedom in design of the vehicle 10, for example, by locating the intake pipe 20 in a low position and lowering a height of a hood that forms the engine compartment 94 in the vertical direction. With the AC charger 66 being housed within the engine compartment 94, the vehicle 10 can have a large interior space.

There will be described other embodiments of this invention. The same reference signs as used in the above-described embodiment will be used in the following embodiments, to identify the practically corresponding elements, and descriptions thereof are not provided.

Second Embodiment

In the above-described first embodiment, the supercharger 18 is located on the rear side of the engine main body 12a in the longitudinal direction. In this second embodiment, the supercharger 18 is located on a front side of the engine main body 12a in the longitudinal direction.

Figure 9:
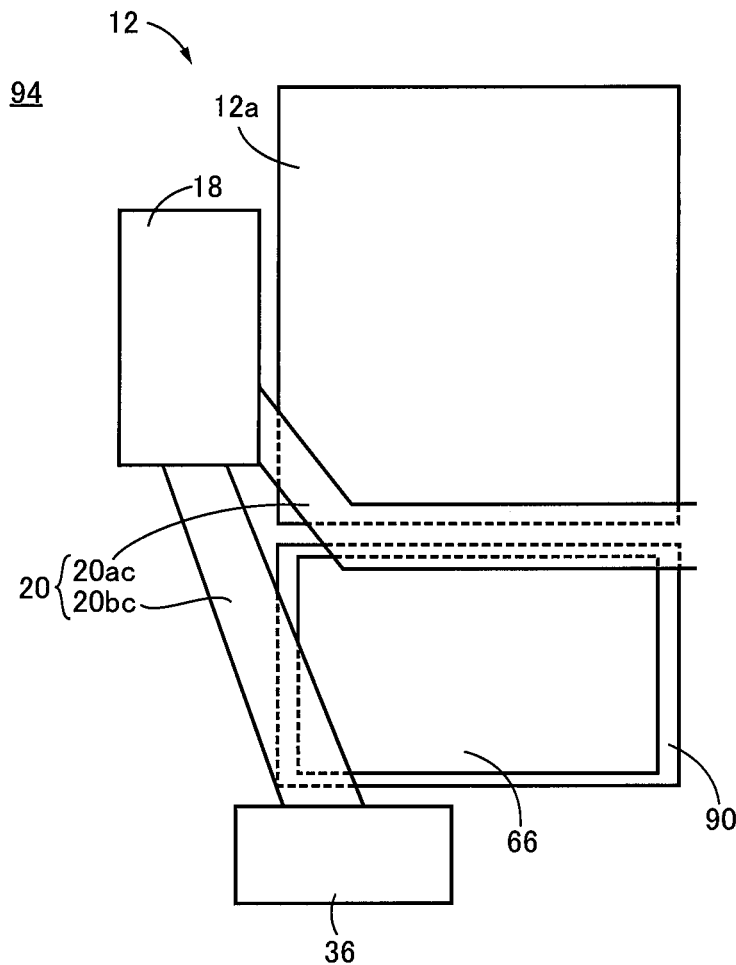
FIG. 9 is a view showing, by way of example, positions of the intake pipe and other components within the engine compartment, in a case in which a supercharger is provided on a front side of an engine main body.
Figure 9:
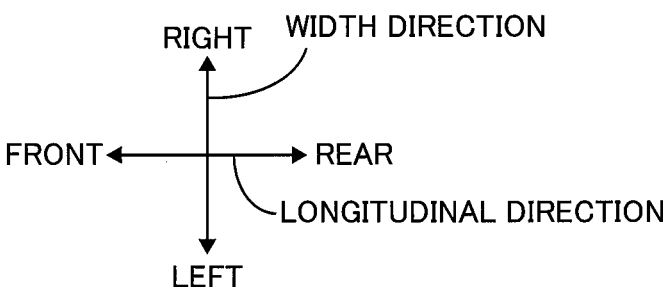

FIG. 9 is a view showing, by way of example, positions of the intake pipe 20 and other components within the engine compartment 94, in a case in which the supercharger 18 is located on the front side of the engine main body 12a. The view of FIG. 9 is as seen from the upper side of the vehicle 10 in the vertical direction, like the view of FIG. 7 in the above-described first embodiment. As shown in FIG. 9, in the vehicle 10, when being installed in the vehicle 10, the intake pipe 20 is located on the upper side of the AC charger 66 in the vertical direction. That is, the intake pipe 20 passes above the AC charger 66 that is located on the upper side of the hybrid drive unit 90. In the vehicle 10, the air cleaner 36 is located on one of opposite sides of the AC charger 66 which is remote from the engine 12 in the width direction. The pre-supercharger intake pipe 20bc is located on the upper side of the AC charger 66 in the vertical direction, when being installed in the vehicle 10.

In this second embodiment, it is possible to obtain substantially the same effects as in the above-described first embodiment. For example, in this second embodiment, too, the AC charger 66 together with the engine 12, transaxle 92 and electric-power control unit 74 can be located within the engine compartment 94.

Third Embodiment

In the above-described first embodiment, the electric vehicle is the electric vehicle 10 that is a hybrid electric vehicle including the engine 12, first electric motor MG1 and second electric motor MG2. In this third embodiment, the electric vehicle is an electric vehicle 200 that is another hybrid electric vehicle other than the electric vehicle 10.

Figure 10:
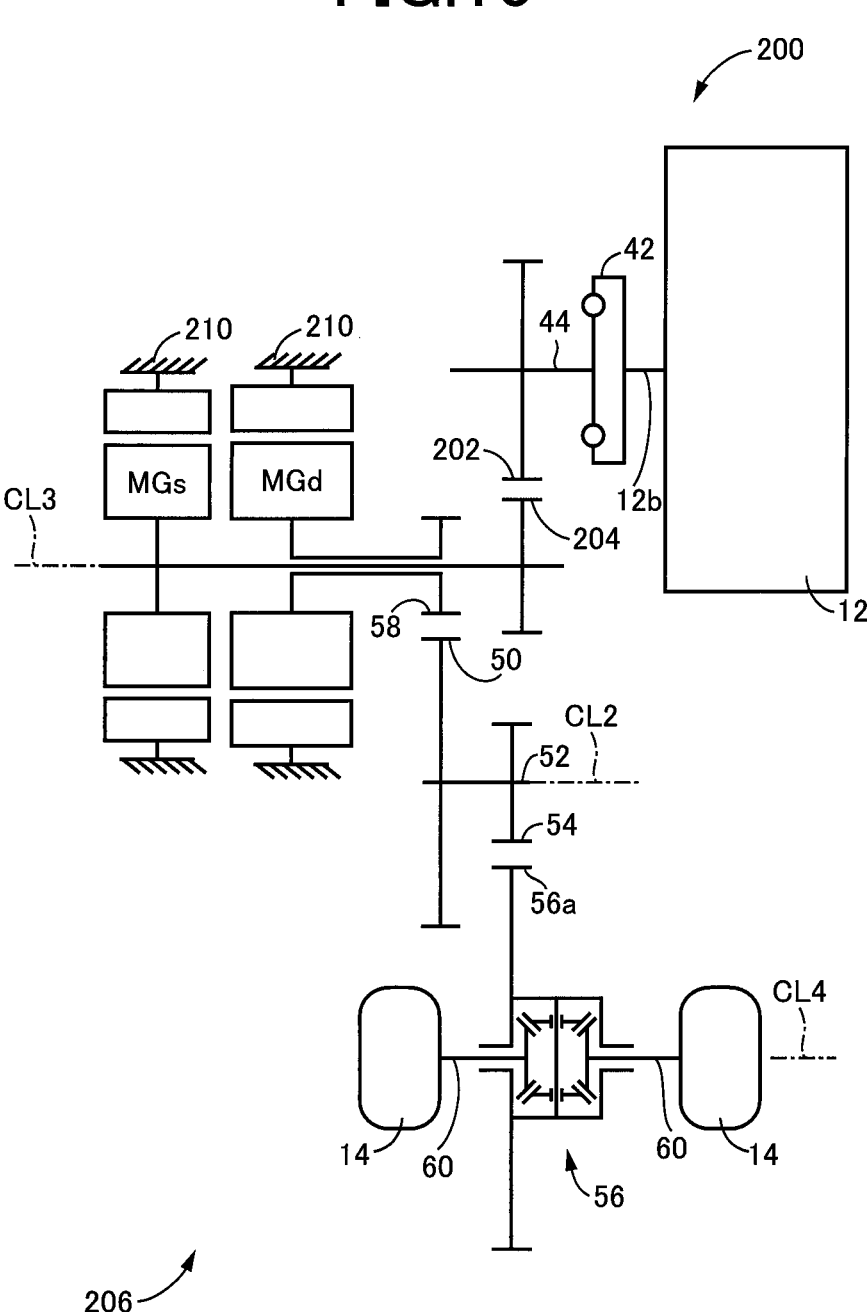
FIG. 10 is a view schematically showing a construction of an electric vehicle to which the present invention is applied, wherein this electric vehicle is constructed according to another embodiment other than an embodiment according to which the electric vehicle of FIG. 1 is constructed.

FIG. 10 is a view schematically showing a construction of the electric vehicle 200 (hereinafter simply referred to as "vehicle 200") of this third embodiment in which two electric motors are provided. As shown in FIG. 10, the vehicle 200 is a series hybrid electric vehicle including the engine 12, a driving electric motor MGd that is an electric motor functioning as a power source, and a power-supplying electric motor MGs that is another electric motor connected to the engine 12 in a power transmittable manner.

The vehicle 200 is different from the vehicle 10 of the above-described first embodiment mainly in that the transmission portion 46 including the first electric motor MG1 is replaced by the power-supplying electric motor MGs which is to be caused to generate the electric power by the power of the engine 12 and which is not connected to a power transmission path (through which the power is to be transmitted to the drive wheels 14). The engine 12 and the power-supplying electric motor MGs are connected to each other through a drive gear 202 and a driven gear 204, wherein the drive gear 202 is fixed on the input shaft 44 unrotatably relative to the input shaft 44, and wherein the driven gear 204 is fixed on a rotor shaft of the power-supplying electric motor MGs unrotatably relative to the rotor shaft of the power-supplying electric motor MGs. The rotor shaft of the power-supplying electric motor MGs passes through a though-hole of a hollow rotor shaft of the driving electric motor MGd, such that the rotor shaft of the power-supplying electric motor MGs is rotatable relative to the hollow rotor shaft of the driving electric motor MGd. That is, the power-supplying electric motor MGs is disposed to be coaxial with the driving electric motor MGd.

The power-supplying electric motor MGs of the vehicle 200 corresponds to the first electric motor MG1 of the vehicle 10. The driving electric motor MGd of the vehicle 200 corresponds to the second electric motor MG2 of the vehicle 10. Like the vehicle 10, the vehicle 200 further includes a high-voltage battery (not shown), an AC charger (not shown), an in-vehicle charging cable (not shown), a charging inlet (not shown), an auxiliary battery (not shown) and an electric-power control unit (not shown) that corresponds to the electric-power control device. The electric power generated by the power-supplying electric motor MGs is supplied to the second electric motor MG2 by the electric-power control unit, or used to charge the high-voltage battery by the electric-power control unit. As in the vehicle 10, in the vehicle 200, a transaxle (driving apparatus) 208 (see FIG. 11) includes a power transmission device 206, the power-supplying electric motor MGs and the driving electric motor MGd, such that the transaxle 208 and the electric-power control unit constitute a hybrid drive unit (mechanical-electrical integrated unit), and are housed in a single casing 210.

Figure 11:
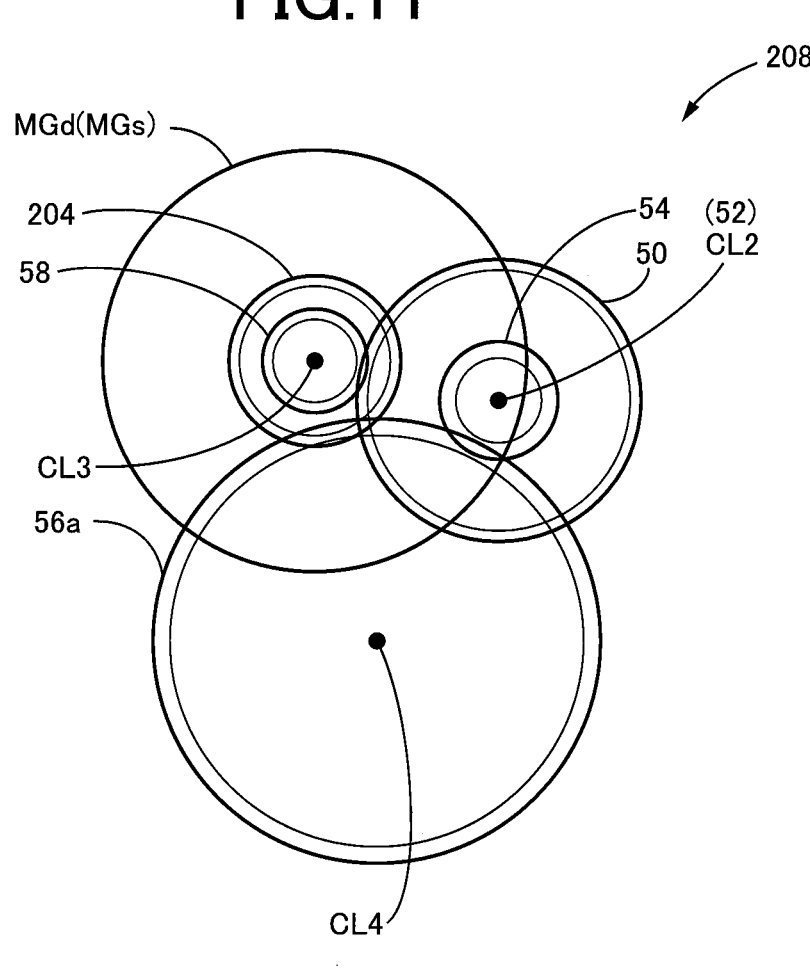
FIG. 11 is a view showing, by way of examples, positions of respective components of a driving apparatus in the electric vehicle of FIG. 10.
Figure 11:
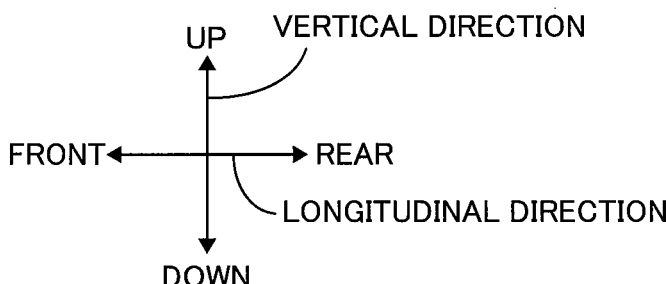

FIG. 11 is a view showing, by way of examples, positions of respective components of the transaxle 208. As shown in FIG. 11, when the transaxle 208 is installed in the vehicle 200, the second, third and fourth axes CL2, CL3, CL4 are parallel to a horizontal direction perpendicular to the longitudinal direction of the vehicle 200. Further, when the transaxle 208 is installed in the vehicle 200, the second, third and fourth axes CL2, CL3, CL4 are located in respective positions, such that the driving electric motor MGd, driven shaft 52 and differential gear device 56 are arranged in this order of description from top to bottom in the vertical direction of the vehicle 200, and such that the driving electric motor MGd, differential gear device 56 and driven shaft 52 are arranged in this order of description from front to rear in the longitudinal direction of the vehicle 200. Owing to this arrangement, distances among the second, third and fourth axes CL2, CL3, CL4 are appropriately ensured, and a dimension of the transaxle 208 in the vertical direction is reduced. Therefore, a surplus space is created by the arrangement of the driving electric motor MGd and the power-supplying electric motor MGs, and a space is created on an upper side of the driving electric motor MGd in the vertical direction. The electric-power control unit is provided in this space.

Although not shown in the drawings, when being installed in the vehicle 200, the electric-power control unit is located on the upper side of the transaxle 208 in the vertical direction, like the electric-power control unit 74 of the vehicle 10. Further, a lower portion of the electric-power control unit of the vehicle 200 in the vertical direction and an upper portion of the driving electric motor MGd in the vertical direction are located in respective positions overlapping with each other as seen in the horizontal direction, particularly, as seen in the longitudinal direction. The electric-power control unit is provided in a space created by the reduction of the dimension of the transaxle 208 in the vertical direction, and a space is created on the upper side of the hybrid drive unit in the vertical direction. Thus, when being installed in the vehicle 200, the AC charger is located on the upper side of the hybrid drive unit in the vertical direction. Further, when being installed in the vehicle 200, the intake pipe 20 is located on the upper side of the AC charger in the vertical direction.

In this third embodiment, it is possible to obtain substantially the same effects as in the above-described first embodiment. For example, in this third embodiment, too, the AC charger together with the engine 12, transaxle 208 and electric-power control unit can be located within the engine compartment.

While the preferred embodiments of this invention have been described in detail by reference to the drawings, it is to be understood that the invention may be otherwise embodied.

For example, in the above-described embodiments, the engine 12 is an engine including the supercharger 18. However, this is not essential. The present invention is applicable also to a case in which the engine 12 is an engine (internal-combustion engine) that is other than the engine including the supercharger 18.

In the above-described first embodiment, when the transaxle 92 is installed in the vehicle 10, the first, second, third and fourth axes CL1, CL2, CL3, CL4 are located in respective positions such that the first electric motor MG1, driven shaft 52, differential gear device 56 and second electric motor MG2 are arranged in this order of description from front to rear in the longitudinal direction. However, this arrangement is not essential. For example, when the transaxle 92 is installed in the vehicle 10, the first, second, third and fourth axes CL1, CL2, CL3, CL4 may be located in respective positions such that the first electric motor MG1, driven shaft 52, differential gear device 56 and second electric motor MG2 are arranged in this order of description from rear to front in the longitudinal direction.

In the above-described third embodiment, the vehicle 200 may include a gear which is coaxial with the input shaft 44, for example, wherein the gear is to be connected to the input shaft 44 through a clutch, and meshes with the reduction gear 58, so that the power of the engine 12 and the power of the power-supplying electric motor MGs can be transmitted to the drive wheels 14, with the clutch being engaged. Where the power of the engine 12 can be thus transmitted to the drive wheels 14 through a mechanical mechanism, the power-supplying electric motor MGs is not necessarily needed. Further, in the vehicle 200, the power-supplying electric motor MGs and the driving electric motor MGd may be disposed in respective axes other than each other, as shown in FIG. 5.

It is to be understood that the embodiments described above are given for illustrative purpose only, and that the present invention may be embodied with various modifications and improvements which may occur to those skilled in the art.

NOMENCLATURE OF ELEMENTS

10: electric vehicle
12: engine
14: drive wheel
16: power transmission device
32: intake device
34: resonator (intake device)
36: air cleaner (intake device)
18: supercharger
20: intake pipe 20*bc*: pre-supercharger intake pipe (portion of the intake pipe which is located downstream of the intake device and upstream of the supercharger)

40: casing

64: high-voltage battery (driving battery)

66: AC charger (charger)

74: electric-power control unit (electric-power control device)

90: hybrid drive unit (mechanical-electrical integrated unit)

92: transaxle (driving apparatus)

100: external power supply

200: electric vehicle

206: power transmission device

208: transaxle (driving apparatus)

210: casing

MG2: second electric motor (electric motor)

MGd: driving electric motor (electric motor)

What is claimed is:

1. An electric vehicle comprising:

a drive wheel;

an engine;

an intake device provided upstream of an intake pipe of the engine;

an electric motor;

a power transmission device configured to transmit a power of the electric motor to the drive wheel;

a driving battery;

an electric-power control device configured to control an electric power transferred between the driving battery and the electric motor; and a charger configured to charge the driving battery with the electric power supplied from an external power supply, wherein the electric motor and the power transmission device constitute at least a part of a driving apparatus, wherein the driving apparatus and the electric-power control device constitute a mechanical-electrical integrated unit which is housed in a single casing and which is located in a position adjacent to the engine, wherein the charger is located on an upper side of the mechanical-electrical integrated unit in a vertical direction of the electric vehicle, wherein the intake pipe is located on the upper side of the mechanical-electrical integrated unit in the vertical direction, and wherein the intake pipe and the mechanical-electrical integrated unit are located in respective positions overlapping with each other as seen in a vertical direction of the electric vehicle.

2. An electric vehicle comprising:

a drive wheel;

an engine;

an intake device provided upstream of an intake pipe of the engine;

an electric motor;

a power transmission device configured to transmit a power of the electric motor to the drive wheel;

a driving battery, an electric-power control device configured to control an electric power transferred between the driving battery and the electric motor, and a charger configured to charge the driving battery with the electric power supplied from an external power supply, wherein the electric motor and the power transmission device constitute at least a part of a driving apparatus, wherein the driving rat ad the electric power control device constitute a mechanical-electrical integrated unit which is housed in a single casing and which is located in a position adjacent to the engine, wherein the charger is located on an upper side of the mechanical-electrical integrated unit in a vertical direction of the electric vehicle, wherein the intake pipe is located on the upper side of the mechanical-electrical integrated unit in the vertical direction, wherein the engine includes a supercharger, wherein the intake pipe includes a portion which is located downstream of the intake device and upstream of the supercharger, and wherein the portion of the intake pipe is located on the upper side of the mechanical-electrical integrated unit in the vertical direction.

3. An electric vehicle comprising:

a drive wheel;

an engine;

an intake device provided upstream of an intake pipe of the engine;

an electric motor, a power transmission device configured to transmit a power of the electric motor to the drive wheel;

a driving battery;

an electric-power control device configured to control an electric power transferred between the driving battery and the electric motor; and a charger configured to charge the driving battery with the electric power supplied from an external power supply, wherein the electric motor and the power transmission device constitute at least a part of a driving apparatus, wherein the driving apparatus and the electric power control device constitute a mechanical-electrical integrated unit which is housed in a single casing and which is located in a position adjacent to the engine, wherein the charger is located on an upper side of the mechanical-electrical integrated unit in a vertical direction of the electric vehicle, wherein the intake pipe is located on the upper side of the mechanical-electrical integrated unit in the vertical direction, and wherein the intake pipe is located on an upper side of the charger in the vertical direction.

4. The electric vehicle according to claim 3, wherein the engine includes a supercharger, wherein the intake pipe includes a portion which is located downstream of the intake device and upstream of the supercharger, and wherein the portion of the intake pipe is located on an upper side of the charger in the vertical direction.

5. An electric vehicle comprising:

a drive wheel;

an engine;

an intake device provided upstream of an intake pipe of the engine;

an electric motor;

a power transmission device configured to transmit a power of the electric motor to the drive wheel;

a driving battery;

an electric-power control device configured to control an electric power transferred between the driving battery and the electric motor; and a charger configured to charge the driving battery with the electric power supplied from an external power supply, wherein the electric motor and the power transmission device constitute at least a part of a driving apparatus, wherein the driving apparatus and the electric-power control device constitute a mechanical-electrical integrated unit which is housed in a single casing and which is located in a position adjacent to the engine, wherein the charger is located on an upper side of the mechanical-electrical integrated unit in a vertical direction of the electric vehicle, wherein the intake pipe is located on the upper side of the mechanical-electrical integrated unit in the vertical direction, and wherein the intake device is located on one of opposite sides of the charger which is remote from the engine in a width direction of the electric vehicle.

6. An electric vehicle comprising:

a drive wheel;

an engine;

an intake device provided upstream of an intake pipe of the engine;

an electric motor;

a power transmission device configured to transmit a power of the electric motor to the drive wheel;

a driving battery;

an electric-power control device configured to control an electric power transferred between the driving battery and the electric motor; and a charger configured to charge the driving battery with the electric power supplied from an external power supply, wherein the electric motor and the power transmission device constitute at least a part of a driving apparatus, wherein the driving apparatus and the electric-power control device constitute a mechanical-electrical integrated unit which is housed in a single casing and which is located in a position adjacent to the engine, wherein the charger is located on an upper side of the mechanical-electrical integrated unit in a vertical direction of the electric vehicle, wherein the intake pipe is located on the upper side of the mechanical electrical integrated unit in the vertical direction, and

wherein the intake device is located on a front side of the charger in a longitudinal direction of the electric vehicle.

7. An electric vehicle comprising:

a drive wheel;

an engine;

an intake device provided upstream of an intake pipe of the engine;

an electric motor;

a power transmission device configured to transmit of the electric motor to the drive wheel;

a driving battery;

an electric power control device configured to control an electric power transferred between the driving battery and the electric motor; and a charger configured to charge the driving battery with the electric power supplied from external power supply, wherein the electric motor and the power transmission device constitute at least a part of a driving apparatus, wherein the driving apparatus and the electric-power control device constitute a mechanical-electrical integrated unit which is housed in a single casing and which is located in a position adjacent to the engine, wherein the charger is located on an upper side of the mechanical-electrical integrated unit in a vertical direction of the electric vehicle, wherein the intake pipe is located on the upper side of the mechanical-electrical integrated unit in the vertical direction, wherein the electric-power control device is located on an upper side of the driving apparatus in the vertical direction, and wherein a lower portion of the electric-power control device in the vertical direction and an upper portion of the driving apparatus in the vertical direction are located in respective positions overlapping with each other as seen in a horizontal direction of the electric vehicle.

\* \* \* \* \*